(12) United States Patent
Gamkrelidze

(10) Patent No.: US 12,537,893 B2
(45) Date of Patent: Jan. 27, 2026

(54) WEARABLE CONTROL DEVICE

(71) Applicant: Levan Gamkrelidze, Brooklyn, NY (US)

(72) Inventor: Levan Gamkrelidze, Brooklyn, NY (US)

( * ) Notice: Subject to any disclaimer, the term of this patent is extended or adjusted under 35 U.S.C. 154(b) by 808 days.

(21) Appl. No.: 17/897,145

(22) Filed: Aug. 27, 2022

(65) Prior Publication Data

US 2024/0073315 A1  Feb. 29, 2024

(51) Int. Cl.
*H04M 1/72409* (2021.01)

(52) U.S. Cl.
CPC .............................. *H04M 1/724094* (2022.02)

(58) Field of Classification Search
CPC ........ H04M 1/724094; H04M 1/72412; G06F 1/163; G06F 1/1673
See application file for complete search history.

(56) References Cited

U.S. PATENT DOCUMENTS

| | | | | |
|---|---|---|---|---|
| 8,600,030 B2 * | 12/2013 | Kannappan | ....... | H04M 1/72412 455/414.1 |
| 10,037,052 B2 * | 7/2018 | Stotler | ................... | G06F 3/016 |
| 2021/0020020 A1 * | 1/2021 | Rothschild | ......... | G08B 21/0453 |
| 2022/0148713 A1 * | 5/2022 | Gordon | .................. | G16H 30/40 |
| 2022/0233142 A1 * | 7/2022 | Hasan | .................... | A61B 5/681 |
| 2024/0126382 A1 * | 4/2024 | Yoo | .................... | G06V 40/1365 |
| 2025/0108545 A1 * | 4/2025 | Haverinen | ........ | B29C 45/14598 |
| 2025/0216901 A1 * | 7/2025 | von Badinski | ...... | A61B 5/1455 |
| 2025/0234233 A1 * | 7/2025 | Kim | ..................... | H04W 24/10 |

FOREIGN PATENT DOCUMENTS

WO   WO-2015119384 A1 * 8/2015 ............. H04B 1/385

* cited by examiner

*Primary Examiner* — Julio R Perez

(74) *Attorney, Agent, or Firm* — The Iwashko Law Firm, PLLC; Lev Ivan Gabriel Iwashko

(57) ABSTRACT

A wearable control device to remotely connect to an external device, the wearable control device including a digit cover, including a main body to be worn around a digit of a user, and a digit receiving aperture disposed at a first end of the main body to receive the digit therein, and a display unit disposed on at least a portion of the main body to display at least one of an interface and at least one application corresponding to at least one of an interface and at least one application on the external device, and to receive at least one input thereon, such that the external device performs an operation in response to the at least one input.

3 Claims, 2 Drawing Sheets

WEARABLE CONTROL DEVICE

BACKGROUND

1. Field

The present general inventive concept relates generally to mobile devices, and particularly, to a wearable control device.

2. Description of the Related Art

Mobile devices including cell phones and/or tablets are useful devices that combine computing capabilities with portability. These mobile devices allow a user to make a phone call, emit a beam of light, perform calculations, play games, and/or set alarms.

Unfortunately, there are many times where holding any given mobile device can be difficult, such as while driving, riding a bicycle, carrying groceries, exercising, and/or other active tasks. Also, the mobile device while being portable is often inconvenient for use during those situations. Often times, using the mobile device while performing other activities will result in the mobile device being dropped and/or damaged.

Therefore, there is a need for a wearable control device that can be worn by the user to remotely control the mobile device without the user touching the mobile device.

SUMMARY

The present general inventive concept provides a wearable control device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a wearable control device to remotely connect to an external device, the wearable control device including a digit cover, including a main body to be worn around a digit of a user, and a digit receiving aperture disposed at a first end of the main body to receive the digit therein, and a display unit disposed on at least a portion of the main body to display at least one of an interface and at least one application corresponding to at least one of an interface and at least one application on the external device, and to receive at least one input thereon, such that the external device performs an operation in response to the at least one input.

The wearable control device may further include a control unit disposed within at least a portion of the main body to render at least one of the interface and the at least one application on the display unit based on at least one of the interface and the at least one application of the external device.

The wearable control device may further include a plurality of digit ridges disposed within at least a portion of the digit receiving aperture to prevent the main body from falling off the digit of the user.

The wearable control device may further include an elevated protrusion disposed on at least a portion of the main body to elevate a portion of the main body away from an external surface equivalent to a height of the elevated protrusion while the main body is disposed on the external surface.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Wearable Control Device 100
Digit Cover 110
Main Body 111
Digit Receiving Aperture 112
Tapered End 113
Display Unit 120
Control Unit 130
Communication Unit 140
Power Source 150
Charging Port 160
Digit Ridges 170
Elevated Protrusion 180

Figure 1:
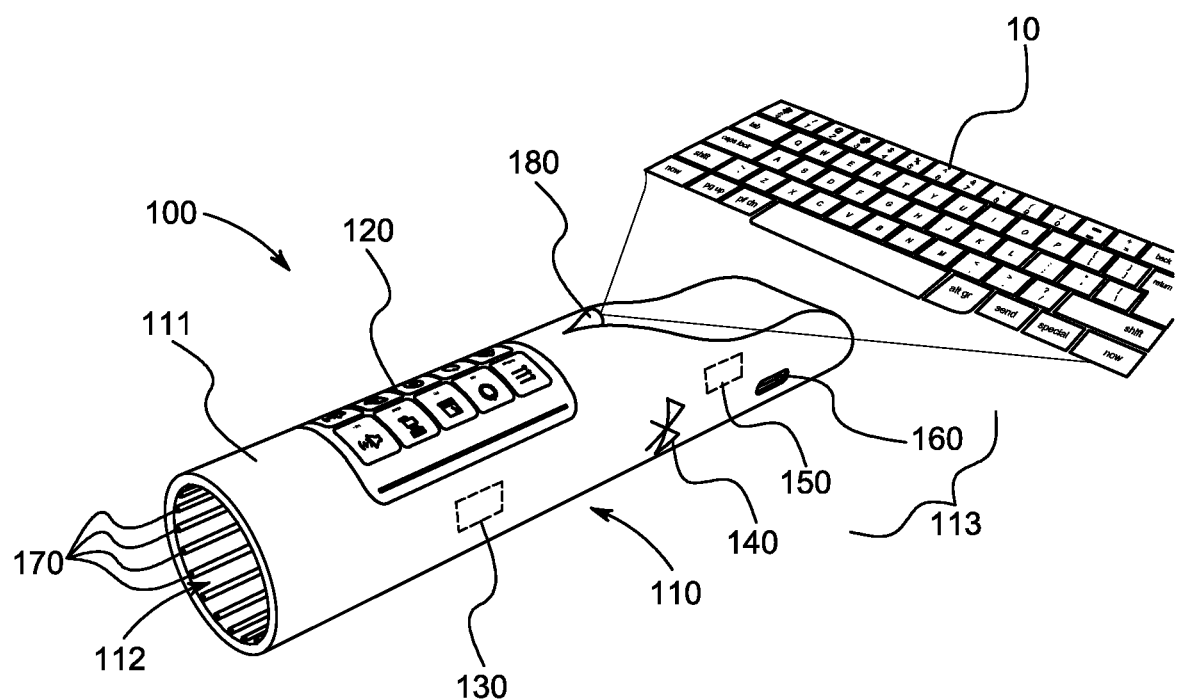
FIG. 1 illustrates a side perspective view of a wearable control device, according to an exemplary embodiment of the present general inventive concept.

FIG. 1 illustrates a side perspective view of a wearable control device 100, according to an exemplary embodiment of the present general inventive concept.

Figure 2:
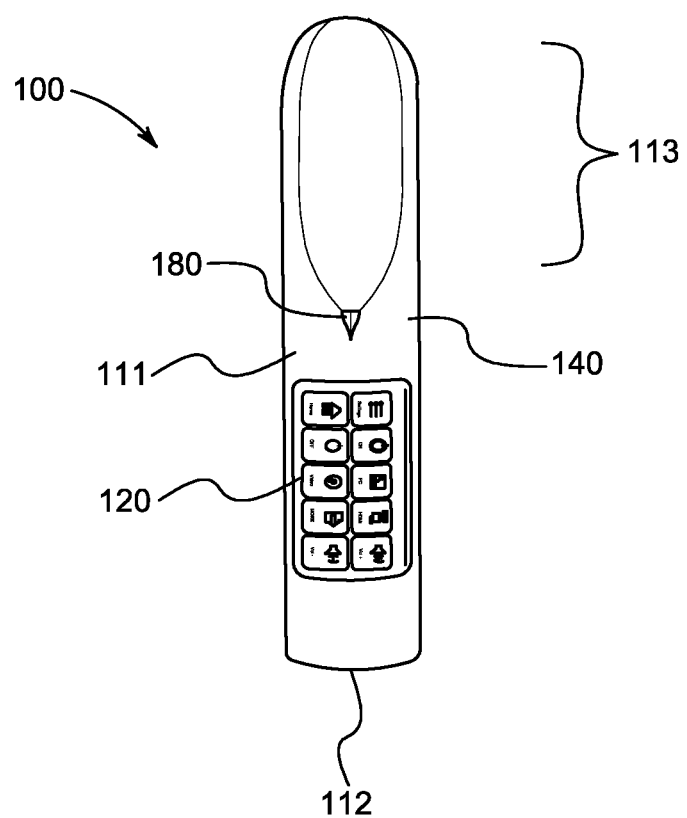
FIG. 2 illustrates an elevational top view of the wearable control device, according to an exemplary embodiment of the present general inventive concept.

FIG. 2 illustrates an elevational top view of the wearable control device 100, according to an exemplary embodiment of the present general inventive concept.

The wearable control device 100 may be constructed from at least one of metal, plastic, wood, glass, and rubber, etc., but is not limited thereto.

The wearable control device 100 may include a digit cover 110, a display unit 120, a control unit 130, a communication unit 140, a power source 150, a charging port 160, a plurality of digit ridges 170, and an elevated protrusion 180, but is not limited thereto.

The digit cover 110 may include a main body 111, a digit receiving aperture 112, and a tapered end 113, but is not limited thereto.

The main body 111 may have a size (e.g., length, width, circumference, diameter) and/or a shape corresponding to a size and/or a shape of at least one limb and/or digit. For example, the main body 111 may be removably disposed on at least a portion of a finger and/or a toe, such as an index finger. In other words, the main body 111 may be worn around the digit of a user, such that the main body 111 may at least partially cover and/or enclose the digit of the user corresponding to a length of the digit inserted into the main body 111.

The digit receiving aperture 112 may be disposed at a first end of the main body 111. The digit receiving aperture 112 may at least partially extend a length of the main body 111 toward a second end of the main body 111 opposite with respect to the first end. The digit receiving aperture 112 may receive the digit therein.

The tapered end 113 may be disposed on at least a portion of the second end of the main body 111. The tapered end 113 may have a circumference and/or a diameter less than a circumference and/or a diameter of a remainder of the main body 111. Specifically, the tapered end 113 may narrow and/or taper toward the second end of the main body 111. As such, the tapered end 113 may have a tighter fit around the digit of the user within the main body 111 with respect to the remainder of the main body 111.

The display unit 120 may include a plasma screen, an LCD screen, a light emitting diode (LED) screen, an organic LED (OLED) screen, a computer monitor, a hologram output unit, a sound outputting unit, or any other type of device that visually or aurally displays data.

Also, the display unit 120 may be combined with an input unit to be a touch-screen.

The display unit 120 may be disposed on at least a portion of the main body 111. The display unit 120 may display an interface and/or at least one application corresponding to an interface and/or at least one application as operating and/or displayed on an external device 10, such as a computing device, a mobile device, a cell phone, a tablet computer, a laptop computer, a personal digital assistant (PDA), and/or a desktop computer. Moreover, the display unit 120 may receive at least one input thereon, such that the external device 10 may perform an operation in response to the at least one input.

The control unit 130 may include a processing unit, a communication unit, and a storage unit, but is not limited thereto.

The processing unit (or central processing unit, CPU) of the control unit 130 may include electronic circuitry to carry out instructions of a computer program by performing basic arithmetic, logical, control and input/output (I/O) operations specified by the instructions. The processing unit of the control unit 130 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processing unit of the control unit 130 may also include a microprocessor and a microcontroller.

The storage unit of the control unit 130 may include a random access memory (RAM), a read-only memory (ROM), a hard disk, a flash drive, a database connected to the Internet, cloud-based storage, Internet-based storage, or any other type of storage unit.

The control unit 130 may have a software application and/or a mobile application running thereon. For sake of brevity, the software application and/or the mobile application may hereafter be referred to as an app. The control unit 130 may have the app preloaded during manufacture and/or alternatively, the control unit 130 may connect to the Internet to download and/or store the app thereon.

The control unit 130 may be disposed within at least a portion of the main body 111 and/or connected to the display unit 120. The control unit 130 executing the app may render the interface and/or the at least one application based on the interface and/or the at least one application of the external device 10. Moreover, the control unit 130 may monitor the display unit 120 for the at least one input to register and/or send the at least one input to the external device 10 to control and/or operate the mobile device 10.

The communication unit 140 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, global positioning system (GPS) receiver, USB, Firewire, and Ethernet.

The communication unit 140 may be disposed within at least a portion of the main body 111 and/or connected to the control unit 130. The communication unit 140 may transmit at least one signal to the external device 10 in response to receiving a command from the control unit 130. For example, the communication unit 140 may transmit the at least one input received by the display unit 120 to the external device 10 in response to the command by the control unit 130.

Furthermore, the communication unit 140 may receive data from the external device 10 to be identified and/or processed by the control unit 130. For example, the communication unit 140 may receive updates to the interface and/or the at least one application of the external device 10, such that the control unit 130 may update a display of the display unit 120.

The power source 150 may include a battery and a solar cell, but is not limited thereto.

The power source 150 may be disposed within at least a portion of the main body 111. The power source 150 may provide power to the display unit 120, the control unit 130, and/or the communication unit 140.

The charging port 160 may include a universal serial bus (USB) port, but is not limited thereto.

The charging port 160 may be disposed on at least a portion of the main body 111 and/or connected to the power source 150. The charging port 160 may receive a connection from an external power source, such as a power outlet and/or an external battery. As such, the charging port 160 may send power from the external power source to the power source 150 to charge the power source 150.

The plurality of digit ridges 170 may be disposed within at least a portion of the digit receiving aperture 112. The plurality of digit ridges 170 may protrude away from an interior surface of the main body 111. As such, the plurality of digit ridges 170 may snugly fit the digit within the digit receiving aperture 112. Accordingly, the plurality of digit ridges 170 may prevent the main body 111 from falling off the digit of the user.

The elevated protrusion 180 may be disposed on at least a portion of the main body 111. The elevated protrusion 180 may extend away from an outer surface of the main body 111. Additionally, the elevated protrusion 180 may elevate a portion of the main body 111 away from an external surface equivalent to a height of the elevated protrusion 180 while disposed on an external surface, such as a ground surface, a table, a countertop, etc.

Therefore, the wearable control device 100 may facilitate remote control of the external device 10 without requiring the user to touch the external device 10. Also, the wearable control device 100 may allow the user to use the external device 10 while actively engaged in other activities.

The present general inventive concept may include a wearable control device 100 to remotely connect to an external device 10, the wearable control device 100 including a digit cover, including a main body 111 to be worn around a digit of a user, and a digit receiving aperture 112 disposed at a first end of the main body 111 to receive the digit therein, and a display unit 120 disposed on at least a portion of the main body 111 to display at least one of an interface and at least one application corresponding to at least one of an interface and at least one application on the external device 10, and to receive at least one input thereon, such that the external device 10 performs an operation in response to the at least one input.

The wearable control device 100 may further include a control unit 130 disposed within at least a portion of the main body 111 to render at least one of the interface and the at least one application on the display unit 120 based on at least one of the interface and the at least one application of the external device 10.

The wearable control device 100 may further include a plurality of digit ridges 170 disposed within at least a portion of the digit receiving aperture 112 to prevent the main body 111 from falling off the digit of the user.

The wearable control device 100 may further include an elevated protrusion 180 disposed on at least a portion of the main body 111 to elevate a portion of the main body 111 away from an external surface equivalent to a height of the elevated protrusion 180 while the main body 111 is disposed on the external surface.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A wearable control device to remotely connect to an external device, the wearable control device comprising:
   a digit cover, comprising:
      a main body to be worn around a digit of a user,
      a digit receiving aperture disposed at a first end of the main body to receive the digit therein;
   a display unit disposed on at least a portion of the main body to display at least one of an interface and at least one application corresponding to at least one of an interface and at least one application on the external device, and to receive at least one input thereon, such that the external device performs an operation in response to the at least one input; and
   a plurality of digit ridges disposed within an interior surface of the main body to prevent the main body from falling off the digit of the user, such that each of the plurality of digit ridges are disposed longitudinally within the main body and protrude away from an interior surface of the main body.

2. The wearable control device of claim 1, further comprising:
   a control unit disposed within at least a portion of the main body to render at least one of the interface and the at least one application on the display unit based on at least one of the interface and the at least one application of the external device.

3. The wearable control device of claim 1, further comprising:
   an elevated protrusion disposed on at least a portion of the main body to elevate a portion of the main body away from an external surface equivalent to a height of the elevated protrusion while the main body is disposed on the external surface.

* * * * *